Patented Mar. 10, 1936

2,033,612

UNITED STATES PATENT OFFICE 2,033,612

CHLORINE DERIVATIVES OF DIBENZYL AND PROCESS OF PREPARING THEM

Frank M. Clark and Walter M. Kutz, Pittsfield, Mass., assignors to General Electric Company, a corporation of New York No Drawing. Application April 4, 1933, Serial No. 664,359

8 Claims. (Cl. 260—161)

The present invention comprises a range of new resinous materials including solid and liquid halogenated hydrocarbon compounds which are suitable for various uses, and in particular for insulating and cooling uses in electrical apparatus.

When a solid medium has been desired for insulation in electric devices mineral waxes and asphalts have been largely employed. When a liquid medium has been desired in such devices a mineral oil has been commonly used. All of these materials are inflammable and subject to the evolution of combustible gas when an electric arc comes in direct contact with them. When used as an impregnant of cellulosic insulation they promote unequal stress distribution because of their relatively low dielectric constants.

As a consequence of the present invention new non-inflammable and resinous insulating materials have been provided. The dielectric constant of these new products is sufficiently high to reduce unequal stress distribution. Some of these new products are liquid at the temperatures to which electrical devices are exposed or commonly operated.

In accordance with one of the features of our invention we have provided new solid and liquid insulating compounds which are chemically stable under the conditions encountered in electrical devices and which when subjected to the electric arc give off only non-inflammable and non-explosive vapors.

The new and novel products of this invention are termed herein liquid and solid resinous halogenated dibenzyls and while properly considered for practical purposes to be halogenated dibenzyls, it should be understood that such products may contain other reaction products beside those which may be strictly considered to have the chemical structure of dibenzyl.

Dibenzyl is a solid crystalline material which chemically is regarded as made up of aryl and alkyl groups, or as a diphenyl ethane, having the following formula $C_6H_5$—$CH_2$—$CH_2$—$C_6H_5$.

When dibenzyl is chlorinated at high temperatures (ordinarily above 100° C.) the chlorine enters the alkyl group in the molecule. Chlorine may be eliminated, as hydrogen chloride, from such a product under some conditions. Such products hence are unsuitable for use in electric devices. When dibenzyl is chlorinated at lower temperatures in the presence of a suitable catalyst, such as iron chloride, the chlorine enters the aryl group. In some cases such compounds are crystalline. Crystalline products are not suitable for use as dielectric media in electrical apparatus. Dielectric breakdown may result due to ionization in the inter-crystalline voids under voltage.

We have found that liquid and solid halogenated dibenzyl products can be produced which are free from chemical instability and are noncrystalline in nature. Such compounds are made by indirect methods of synthesis employing a type of reaction known as the Friedel-Craft reaction. In accordance with our invention, halogenated dibenzyl compounds can be obtained in which the halogen and hydrogen are present in at least chemically equivalent amounts thereby not only endowing the resulting liquid and resinous material with mass non-inflammability but insuring as well complete non-inflammability of the gases formed by decomposition of the liquid or resinous solid by an electric arc. Because of their higher dielectric constant as compared with the waxes, asphalts, and mineral oils heretofore used, coupled with their non-inflammable characteristics, such materials are therefore particularly well adapted for dielectric use. Our new compositions are capable also of other uses, for example, as lubricants either mixed with mineral oil or by themselves.

The novel features of our invention will be pointed out with greater particularity in the appended claims.

While our invention is not limited in its scope to any particular series of phenyl, or substituted phenyl derivatives, or to any particular halogen, its nature and scope will be illustrated in connection with the preparation of the following examples of various halogenated polyphenyl derivatives of ethane which contain substituted chlorine in their molecular structure. The graphic formula of these compounds may be written

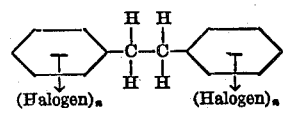

$n$ being 1, 2 or 3.

Example 1

A liquid composition may be prepared by reaction in the presence of aluminum chloride from ethylene dichloride and trichlor benzene in the following manner:

A mixture containing four mols of ethylene dichloride and one mol of trichlor benzene (or multiples thereof) is warmed at 50 to 60° C. for two or three hours with ½ to 1 mol of aluminum chloride (or multiple). In accordance with the Friedel-Craft reaction the chlorine is eliminated from the ethylene dichloride. The resulting mixture is purified by fractional distillation. A viscous liquid is obtained which becomes a resinous solid slightly below room temperature. The boiling range under a pressure of 20 millimeters of mercury is from 300 to 325° C. This liquid may be considered as substantially symmetrical hexachlor dibenzyl, the chlorine content being about 55 per cent by weight.

The heavy viscous liquid obtained as described is particularly well adapted for use as dielectric material in cables and capacitors. It has a dielectric constant of 4.4 at 100° C. measured at 1000 cycles. Its power factor under the same conditions is approximately .2%. The material is substantially non-inflammable. The chlorine atoms being contained in the phenyl nuclei of the molecule are chemically stable. No evidence of corrosive action in contact with metals has been obtained.

This material has particularly favorable dielectric characteristics which renders it capable of being employed in combination with other materials, as for example, trichlorbenzene in various proportions. Such mixture may be employed as an insulating and cooling medium in transformers, switches and other liquid-immersed electrical apparatus.

While trichlor benzene contains chemically equivalent amounts of chlorine and hydrogen, it has limitations for general insulating and cooling liquid use because it does not remain liquid at temperatures below 0° C. When trichlor benzene, however, is compounded with the product hereintofore described, the solidification point is lowered. A composition made up of about equal parts of trichlorbenzene (a mixture of different isomers) and the chlorinated product above disclosed has a pour point of minus 40° C. The pour point as given herein is determined by the method of the American Society of Testing Materials, designated as D—97—27—T. Such a liquid mixture, even when heated to 150° C. for periods of two weeks or more, shows no increase in total acidity and has no corrosive action on copper or aluminum.

Example 2

A solid dielectric material may be prepared in accordance with our invention by employing ethylene dichloride and trichlor benzene in the following manner:

A mixture comprising eight mols of ethylene dichloride and one mol. of trichlor benzene is warmed at 50 to 60° C. from two to three hours with one-half to one molecule (or multiple thereof of in ratio to other ingredients) of aluminum chloride. The resulting mixture is purified by fractional distillation, and a solid resinous material is obtained. This resinous material melts at approximately 50 to 60° C. and distills under 20 millimeters of mercury pressure at 300 to 325° C. This resinous material is also capable of being compounded with trichlor benzene as described in Example 1. The pour point (A. S. T. M. D—97—27—T) is thereby lowered. A mixture comprising about equal parts of trichlor benzene and the above resinous product has a pour point of approximately minus 40° C.

The resinous dibenzyl product prepared as described has the electrical characteristics given for the viscous liquid produced under Example 1. It is non-inflammable.

This product has particular advantage when used as an impregnant in solid type bushings, capacitors, and other apparatus where a solid non-inflammable and stable material is desired.

Example 3

A non-crystalline waxy product is obtained by reacting four mols of dichlor benzene and one mol. ethylene dichloride in the presence of one-half mol. of aluminum chloride, maintaining the reaction mixture at approximately 70° C. for about one hour. The resulting product may be purified by a fractional distillation, having a boiling range under 25 millimeters of mercury pressure of approximately 290 to 310° C. The product obtained may be considered as symmetrical tetrachlor dibenzyl, the chlorine content being about 44 per cent by weight. The product is stable chemically and possesses electrical properties which make it adapted for use in the impregnation of capacitors and other electrical apparatus where a solid non-inflammable material is desired. The product has a dielectric constant of 4.4 when tested at 50° C. at 1000 cycles.

Example 4

When dibenzyl is prepared by condensing two mols of benzene with one mol. of ethylene dichloride in the presence of one-half mol. of aluminum chloride, there is produced in addition to dibenzyl a liquid material boiling higher than 295° C.

When this product is chlorinated to about 25 or 30% chlorine content, a resinous material results which is not only non-inflammable but which when compounded with trichlor benzene in different proportions, as above described in connection with other products, a low freezing liquid composition is formed capable of use as a dielectric in various electric devices, such for example as transformers, bushings, capacitors, generators, and the like.

It will be understood by those skilled in the art that the compositions described are not necessarily chemically pure. These compositions may include halogenated polyphenyl derivatives of ethane of varying halogen content and such mixtures are included in our invention.

What we claim as new and desire to secure by Letters Patent of the United States is:

1. Resinous symmetrical tetrachlor dibenzyl, the chlorine atoms of said compound being attached to phenyl nuclei.
2. Resinous symmetrical hexachlor dibenzyl, the chlorine atoms of said compound being attached to phenyl nuclei.
3. The process which consists in heating to a reaction temperature in the presence of a condensation agent a mixture of ethylene dichloride and a halogenated benzene, said halogenated benzene containing at least one unsubstituted hydrogen atom.
4. The process which consists in heating to a reaction temperature in the presence of a condensation agent a mixture of ethylene dichloride and dichlor benzene.
5. The process which consists in heating to a reaction temperature in the presence of aluminum chloride a mixture of ethylene dichloride and trichlorbenzene.
6. Resinous liquid and solid dielectric materials, consisting essentially of chlorine derivatives of dibenzyl, in which the combined chlorine is contained in aryl groups said materials containing about 44 to 55 per cent by weight of chlorine, being non-inflammable, chemically stable, and having a dielectric constant of about 4.4 at 1000 cycles at a temperature as high as 50° C.

7. A non-crystalline, dielectric material, which is liquid at room temperature, consisting essentially of symmetrical hexachlor dibenzyl, the chlorine atoms being in the phenyl nuclei, said material having a dielectric constant of about 4.4 and a power factor of about .2%, both at 100° C. and solidifying slightly below room temperature.

8. A non-crystalline resinous dielectric material consisting essentially of a symmetrical hexachlor derivative of dibenzyl, in which the combined chlorine is contained in aryl groups said material having a dielectric constant of about 4.4 and a power factor of about .2%, both at 100° C. melting at about 50 to 60° C. and distilling at about 300 to 325° C. under 20 m. m. of mercury pressure.

FRANK M. CLARK.
WALTER M. KUTZ.